F. L. CALGARO.
SUBMARINE CATCHING NET.
APPLICATION FILED OCT. 4, 1917.
1,251,748.
Patented Jan. 1, 1918.
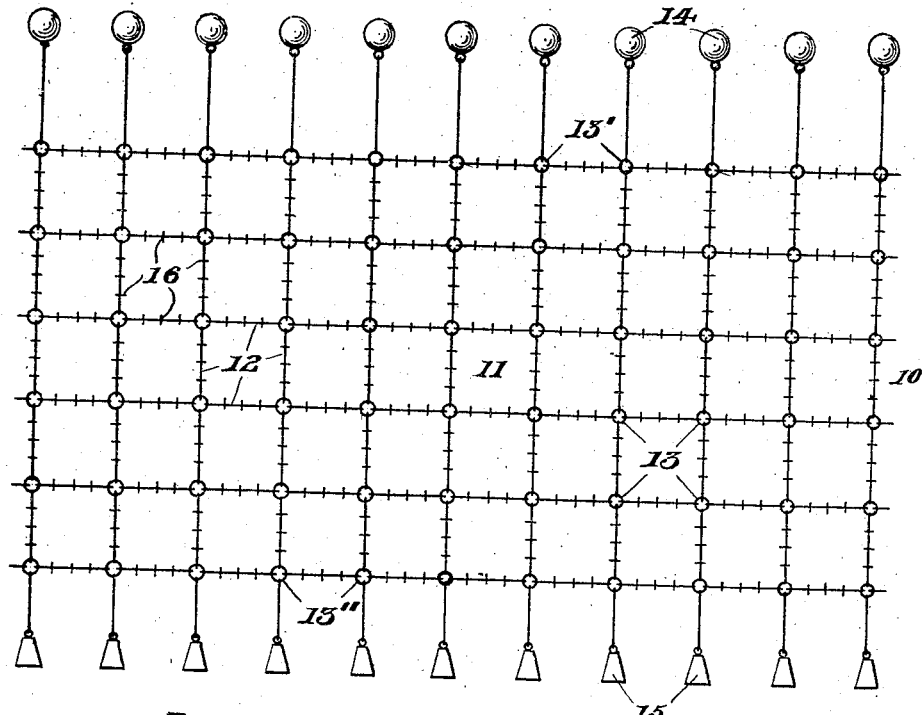
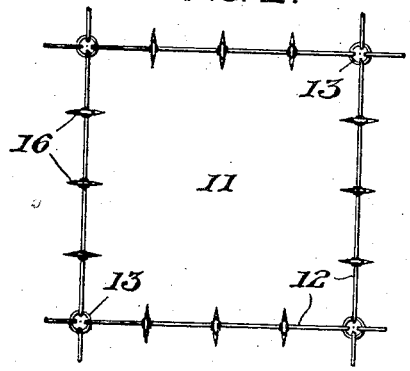
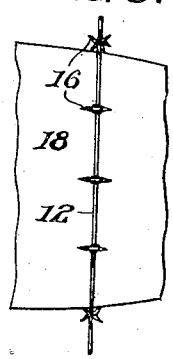
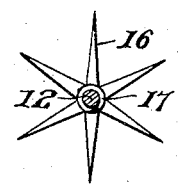
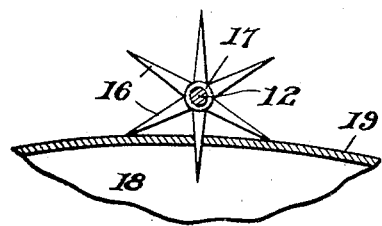
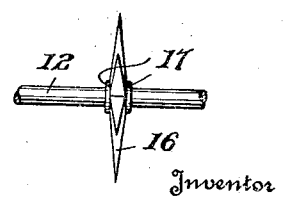
Inventor
F. L. Calgaro
By N. M. Wilson
Attorney

UNITED STATES PATENT OFFICE.

FIORAVANTE LUIGI CALGARO, OF CLARIDGE, PENNSYLVANIA.

SUBMARINE-CATCHING NET.

1,251,748.          Specification of Letters Patent.      Patented Jan. 1, 1918.

Application filed October 4, 1917. Serial No. 194,746.

*To all whom it may concern:*

Be it known that I, FIORAVANTE LUIGI CALGARO, a subject of the King of Italy, residing at Claridge, in the county of Westmoreland and State of Pennsylvania, have invented certain new and useful Improvements in Submarine-Catching Nets, of which the following is a specification.

This invention relates to new and useful improvements in submarine catching nets.

The primary object of the invention is the provision of a net adapted for catching and holding submarines, the net being adapted for suspending in the water at any desired location.

A further object of the device is to provide a net possessing great strength and durability adapted for floating arrangement within the water and so formed that any submarine coming in contact therewith and attempting to pass therethrough, will become securely engaged by portions of the net and prevent the submarine from readily releasing itself and giving an opportunity for destroyers to sink the submarine.

With these general objects in view and others that will appear as the nature of the invention is better understood, the same consists in the novel construction, combination and arrangement of parts hereinafter more fully described, ilustrated in the accompanying drawings, and then claimed.

In the drawings forming a part of this application, and in which like designating characters refer to corresponding parts throughout the several views, Figure 1 is an elevational view of a short length of the device, Fig. 2 is an enlarged elevational view of boat securing portion thereof, Fig. 3 is a side view of the same with the submarine engaged thereby, Fig. 4 is an elevational view of one of the locking wheels employed, Fig. 5 is an edge view thereof, and Fig. 6 is a sectional view showing the operative position of one of the wheels penetrating the shell of a submarine.

Referring more in detail to the drawing, the device broadly consists of a net 10 formed in any desired length and having meshes 11 formed by rods 12 connected to corner rings 13, it being seen that the number of meshes may be multiplied in either direction for forming a net of any desired length and breadth while the rods 12 are preferably straight and of equal length, thereby forming a net having equal sized rectangular meshes 11. The rings are loosely attached to the rods 12 rendering the entire net 10 flexible under the operation of the waves.

Suitable floats 14 are attached to the rings 13' at one edge of the net 10 while weights 15 are attached to the corresponding rings 13'' at the opposite edge of the net. By this arrangement it will be seen that when the net 10 is placed in the water, the weights 15 will maintain the same substantially vertical while the floats 14 will prevent the net from sinking. It is obvious that some other form of suspending means may be provided if desired, such as stretching the net between two ships or supporting posts.

Star-wheels 16 are journaled in any desired numbers upon each of the rods 12 and are prevented from longitudinal movement upon the rods by means of fixed washers 17 arranged at opposite sides of the wheels.

It will be understood that when a submarine such as 18 comes in contact with the net 10, the pointed end of the submarine will pass within the inclosure of one of the meshes 11, the onward travel of the submarine causing the wheels 16 to become embedded into the opposite sides of the shell 19 of the submarine and penetrating the shell as best illustrated in Fig. 6 of the drawing. The rods 12 are slightly resilient and will bend to substantially conform in shape to the contour of the submarine engaging the wheels 16 with the shell 19 entirely around the submarine. In this manner, the net 10 will be secured to the submarine so that the submarine will be required to carry the net with it in any further traveling in any direction, so that the course of the submarine may be readily noted while the net 10 may be anchored in any desired manner for permitting the submarine to travel only a limited distance after its engagement with the net 10.

The net 10 possessing great strength and durability it may be understood that it may be floated or secured at any desired position and will catch and retain any submarines attempting to pass therethrough, it being understood that the meshes 11 of the net 10 are of desirable size for receiving submarines.

What I claim as new is:—

1. A submarine catcher comprising resilient rods, connecting rings between the said rods, oppositely positioned supporting and weighting means for the rods and sharpened penetrating star wheels journaled upon the said rods.

2. A device of the class described comprising resilient rods of equal length positioned in rectangular arrangement, connecting rings for said rods at the ends thereof, the rods and rings forming a net, weights attached to the rings at one edge of the net, supporting floats attached to the rings at the opposite edge of the net, a plurality of pointed engaging star wheels journaled upon each of the said rods, and stop washers upon the rods adjacent the opposite sides of each star wheel.

3. A submarine catcher comprising resilient rods normally arranged in rectangular formation, connecting rings swingingly attached to the ends of the said rods, penetrating star wheels journaled in spaced relations upon said rods adapted for engaging a body passing between the rods, and longitudinal movement preventing means for the wheels carried by the rods.

In testimony whereof I affix my signature.

FIORAVANTE LUIGI CALGARO.

Copies of this patent may be obtained for five cents each, by addressing the "Commissioner of Patents, Washington, D. C."